(12) United States Patent
Cole

(10) Patent No.: US 12,075,764 B2
(45) Date of Patent: Sep. 3, 2024

(54) CUSTOMIZABLE, HORIZONTAL, TANGLE FREE, TUBULAR FISHING POLE CADDY

(71) Applicant: Kemp G. Cole, Deville, LA (US)

(72) Inventor: Kemp G. Cole, Deville, LA (US)

( * ) Notice: Subject to any disclaimer, the term of this patent is extended or adjusted under 35 U.S.C. 154(b) by 611 days.

(21) Appl. No.: 17/301,106

(22) Filed: Mar. 25, 2021

(65) Prior Publication Data

US 2021/0298283 A1  Sep. 30, 2021

Related U.S. Application Data

(60) Provisional application No. 62/994,490, filed on Mar. 25, 2020.

(51) Int. Cl.
| | |
|---|---|
| *A01K 97/10* | (2006.01) |
| *A47B 81/00* | (2006.01) |
| *A47F 7/00* | (2006.01) |
| *B63B 17/00* | (2006.01) |

(52) U.S. Cl.
CPC ............ *A01K 97/10* (2013.01); *A47B 81/005* (2013.01); *A47F 7/0035* (2013.01); *B63B 17/00* (2013.01)

(58) Field of Classification Search
CPC .... A47F 7/0021; A47F 7/0028; A47F 7/0035; A47F 7/00; B63B 17/00; B63B 35/14; A01K 97/10; A47B 81/005
See application file for complete search history.

(56) References Cited

U.S. PATENT DOCUMENTS

| | | | | | |
|---|---|---|---|---|---|
| 602,177 | A | * | 4/1896 | Wiler | A47B 81/005 211/64 |
| 2,285,632 | A | * | 6/1942 | Urbain | A47F 7/0035 248/68.1 |
| 2,287,641 | A | * | 6/1942 | Russell | A01K 97/10 248/538 |
| 2,580,625 | A | * | 1/1952 | Waltz | A01K 97/10 211/89.01 |
| 2,737,990 | A | * | 3/1956 | De Marco | A63B 55/10 294/146 |
| 2,934,298 | A | * | 4/1960 | Aleskin | A01K 97/10 248/512 |
| 2,946,452 | A | * | 7/1960 | Caloiero | A47B 81/005 211/64 |
| 2,987,109 | A | * | 6/1961 | Sohmer | A47C 15/004 294/166 |

(Continued)

*Primary Examiner* — Devin K Barnett
(74) *Attorney, Agent, or Firm* — Dunlap Bennett & Ludwig, PLLC; Anna L. Kinney

(57) ABSTRACT

A fishing pole caddy includes two or more risers arranged in parallel and multiple semicylindrical trays mounted perpendicular to the risers. The risers each have a first and a second attachment side and a base plate at one end from which a male coupling member extends to vertically attach the risers to a gunnel of a boat. The trays bear a fishing pole in a horizontal position. A customizable caddy includes a framework to which about four to sixteen adjustable length tubular housings are removably mounted. The framework includes a first and a second base plate with vertically extending risers. Each housing is perpendicular to the risers and has a longitudinal gap for a horizontally oriented fishing pole. Each housing extends from beneath the pole and rises to a longitudinal lip aligned with an upper portion of the pole. The caddy allows tangle-free storage and transport of fishing poles.

9 Claims, 3 Drawing Sheets

(56) References Cited

U.S. PATENT DOCUMENTS

| | | | | |
|---|---|---|---|---|
| 3,215,181 A * | 11/1965 | Reed | A63B 55/10 | 294/146 |
| 3,421,632 A | 1/1969 | Wood | | |
| 3,483,996 A * | 12/1969 | Scammon | A63B 55/10 | 24/336 |
| 3,546,805 A * | 12/1970 | Schaefer | A01K 97/10 | 43/17 |
| 3,570,793 A * | 3/1971 | Shackel | A01K 97/10 | 248/515 |
| 3,731,817 A | 5/1973 | Fowlkes et al. | | |
| 3,862,508 A * | 1/1975 | Morgan | A01K 97/10 | 43/17 |
| 3,876,076 A | 4/1975 | Hazelhurst | | |
| 3,913,746 A * | 10/1975 | Burton | A47B 81/005 | 211/64 |
| 3,931,893 A * | 1/1976 | Elkins | A47B 81/005 | 224/482 |
| 4,036,368 A * | 7/1977 | Munsch | A01K 97/10 | 248/539 |
| 4,108,313 A * | 8/1978 | Bogar, Jr. | A47B 81/005 | 211/106.01 |
| 4,124,190 A * | 11/1978 | Wheeler | A01K 97/10 | 248/538 |
| 4,139,100 A * | 2/1979 | Reed | A47B 81/005 | 211/64 |
| 4,157,803 A * | 6/1979 | Mack | A01K 97/10 | 248/512 |
| D272,785 S | 2/1984 | Rumbaugh | | |
| 4,658,533 A * | 4/1987 | Mendoza | A01K 97/10 | 248/74.2 |
| 4,796,762 A | 1/1989 | Law | | |
| 4,871,099 A * | 10/1989 | Bogar, Jr. | A01K 97/10 | 248/512 |
| 5,137,319 A * | 8/1992 | Sauder | A01K 97/10 | 294/143 |
| 5,247,759 A * | 9/1993 | Noriega | A01K 97/10 | 43/21.2 |
| 5,657,883 A * | 8/1997 | Badia | A01K 97/10 | D6/552 |
| 5,676,257 A * | 10/1997 | Adkins | A47B 81/005 | 211/64 |
| 5,715,952 A * | 2/1998 | Chichetti | A01K 97/10 | 248/512 |
| 5,755,342 A * | 5/1998 | Hoffman | A47B 81/005 | 248/156 |
| 6,047,491 A * | 4/2000 | De Busk | A01K 97/08 | 248/512 |
| 6,213,441 B1 * | 4/2001 | Baynard | A01K 97/10 | 248/512 |
| 6,390,309 B1 * | 5/2002 | Tucker | B63B 32/83 | D6/552 |
| 6,464,090 B1 * | 10/2002 | Martinez | A63B 55/10 | D6/552 |
| 8,002,126 B1 * | 8/2011 | Drum | A47B 43/00 | 211/195 |
| 8,800,788 B1 | 8/2014 | Guidry | | |
| 9,174,585 B2 | 11/2015 | Noonan | | |
| 9,521,835 B1 | 12/2016 | Gersch | | |
| 10,077,579 B2 | 9/2018 | Brown et al. | | |
| 10,542,738 B2 | 1/2020 | Moses et al. | | |
| 2002/0043014 A1 * | 4/2002 | Kondash | A01K 97/10 | 43/17 |
| 2006/0260174 A1 * | 11/2006 | Crowe | A01K 97/10 | 43/21.2 |
| 2008/0053360 A1 * | 3/2008 | Salerno | A01K 97/10 | 114/343 |
| 2008/0314848 A1 * | 12/2008 | Alley | A01K 97/08 | 211/70.8 |
| 2013/0015151 A1 * | 1/2013 | Wolfbauer | A47F 7/0035 | 211/70.8 |
| 2013/0068710 A1 | 3/2013 | Cearns | | |
| 2013/0186845 A1 | 7/2013 | Harris | | |
| 2014/0129485 A1 * | 5/2014 | Fisher | A63B 71/0036 | 211/85.7 |
| 2014/0332655 A1 | 11/2014 | Colbert | | |
| 2015/0201601 A1 | 7/2015 | Honermann | | |
| 2016/0045024 A1 * | 2/2016 | Roberts | A47B 81/005 | 248/512 |
| 2016/0143437 A1 | 5/2016 | Gabriel | | |
| 2017/0367311 A1 * | 12/2017 | Zale | A01K 97/06 | |
| 2017/0368676 A1 * | 12/2017 | Wright | B25H 3/04 | |
| 2018/0353834 A1 * | 12/2018 | Green | A47F 7/0035 | |
| 2022/0134961 A1 * | 5/2022 | Gwinn | B60R 9/08 | 211/70.8 |
| 2022/0361468 A1 * | 11/2022 | Erdmann | B60R 9/08 | |
| 2022/0394969 A1 * | 12/2022 | Davila | A01K 97/10 | |

* cited by examiner

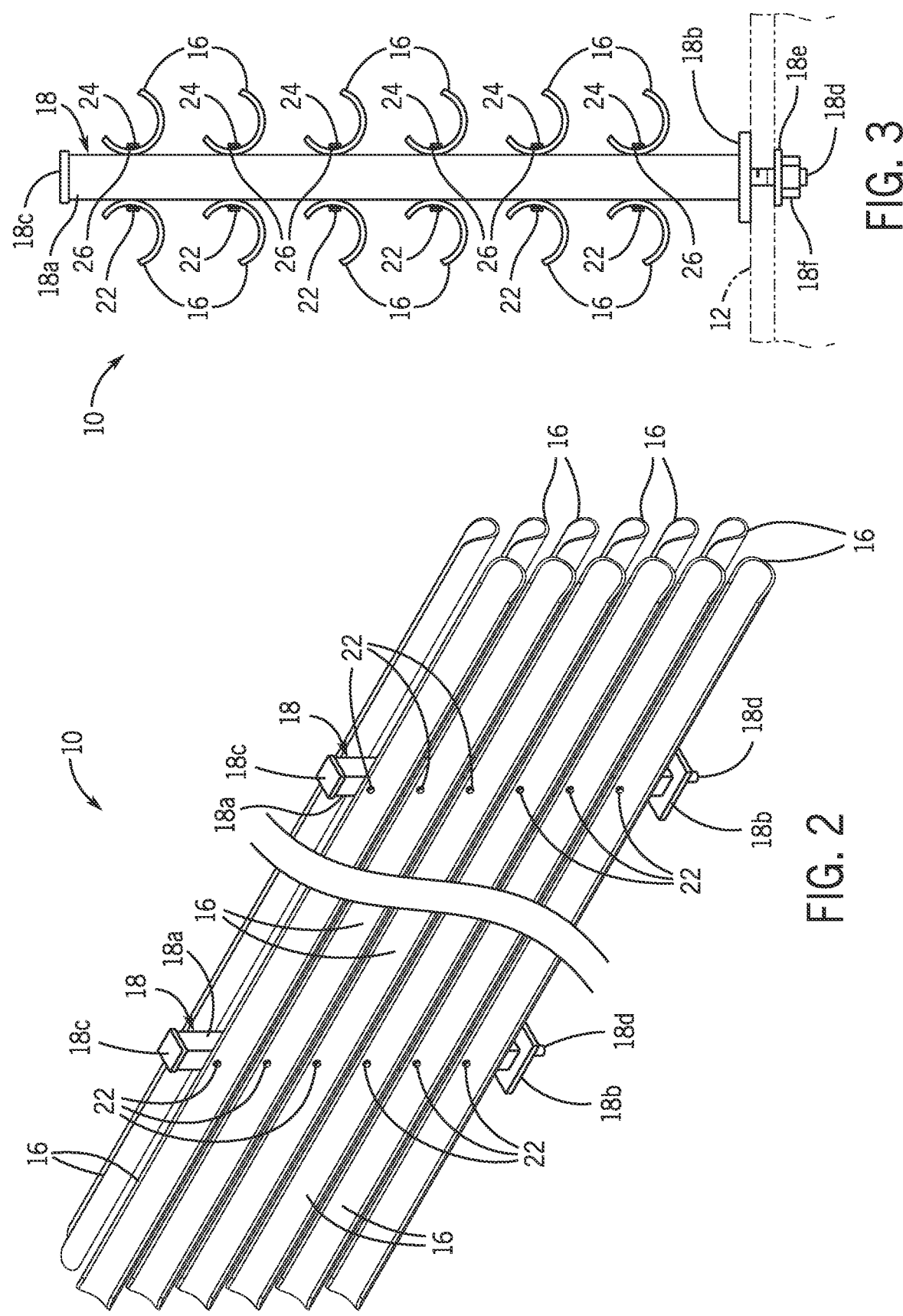

CUSTOMIZABLE, HORIZONTAL, TANGLE FREE, TUBULAR FISHING POLE CADDY

CROSS-REFERENCE TO RELATED APPLICATION

This application claims the benefit of priority of U.S. provisional application No. 62/994,490, filed Mar. 25, 2020, the contents of which are herein incorporated by reference.

BACKGROUND OF THE INVENTION

The present invention relates to fishing pole caddies and, more particularly, to fishing pole caddies for use on the gunnel (or gunwale) of a boat.

Currently available fishing pole caddies allow the fishing line to hang over inside and/or outside the boat. As such, the lines are exposed to wind and often become tangled in transit. Moreover, currently available pole caddies do not keep poles out of the way, taking up space and leaving the poles vulnerable to damage.

As can be seen, there is a need for fishing pole storage that prevents damage to poles and prevents tangled fishing lines.

SUMMARY OF THE INVENTION

The present invention provides safe and tangle-free storage for fishing poles, such as jig fishing poles, while traveling to and from your fishing destination, protecting the poles from damage by keeping them off the deck of the boat, out of the fisherman's way, and out of harm's way. The inventive caddy is generally positioned on the boat gunnel so that fishing poles rest in a horizontal position, saving space, and may be customized to accommodate a desired number of poles of varying length.

In one aspect of the present invention, a fishing pole caddy for tangle-free storage and transport of fishing poles is provided, comprising two or more risers arranged in parallel, each having a first attachment side, a second attachment side, a base plate at one end, and a male coupling member extending therefrom; and a plurality of substantially semicylindrical trays transversely mounted to the first attachment side and/or the second attachment side such that the substantially semicylindrical trays are perpendicular to the risers; wherein the male coupling members are operative to vertically attach the risers to a gunnel of a boat such that the substantially semicylindrical trays are operative to bear a fishing pole in a horizontal position.

In another aspect of the present invention, a customizable fishing pole caddy is provided, comprising a framework operative to mount onto a gunnel of a boat, comprising a first base plate with a first riser extending vertically therefrom and a second base plate with a second riser extending vertically therefrom; and about four to about sixteen adjustable length tubular housings, each with a longitudinal gap therein, removably mounted to the framework perpendicular to the first riser and the second riser; wherein the adjustable length tubular housings are adapted to accept a horizontally oriented fishing pole by way of the longitudinal gap so that the adjustable length tubular housings each extend from beneath the horizontally oriented fishing pole and rise to a longitudinal lip aligned with an upper portion of the horizontally oriented fishing pole.

These and other features, aspects and advantages of the present invention will become better understood with reference to the following drawings, description, and claims.

BRIEF DESCRIPTION OF THE DRAWINGS

FIG. 2 is another perspective view thereof;

FIG. 3 is a side elevation view thereof; and

DETAILED DESCRIPTION OF THE INVENTION

Figure 1:
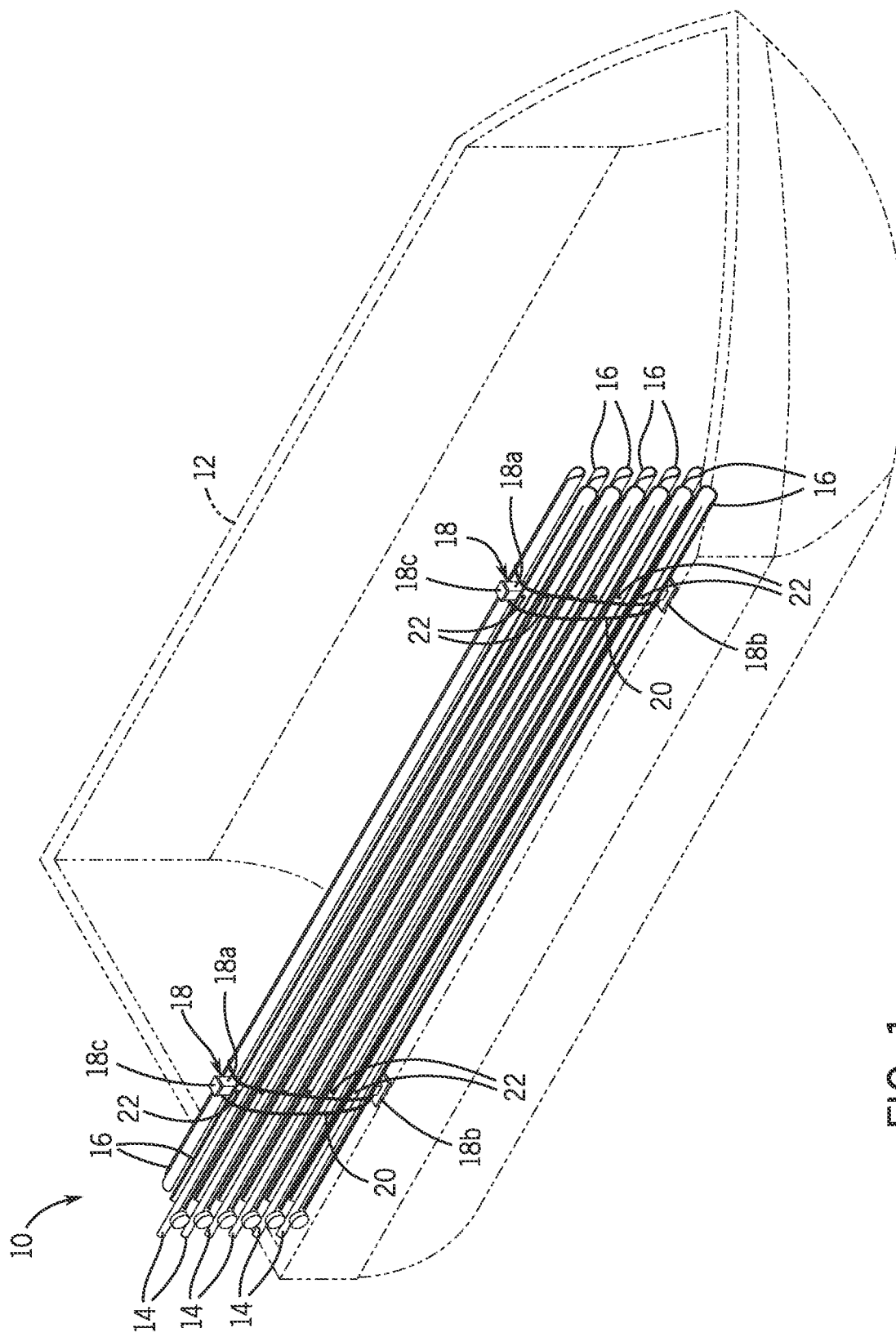
FIG. 1 is perspective view of a fishing pole caddy according to an embodiment of the present invention, shown in use.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

As used herein, the term "riser" refers to a vertical pipe or tube.

Broadly, one embodiment of the present invention is a customizable fishing pole caddy comprising framework components, storage components, and securing components. The inventive caddy storage components include pipes, tubular housings, or tubes adapted to accept fishing poles by having a longitudinal gap extending lengthwise along the tube forming a longitudinal lip, to provide easy, uncomplicated access to fishing poles while keeping the fishing poles secure and the fishing lines tangle-free. The lip may rise to be aligned or level with an upper portion of the horizontally positioned fishing pole or higher. The pipes are removably attached to a framework and may be mounted onto the gunnel of the boat. The length of the pipes may be adjusted to accommodate different length poles and the number of pipes can be customized to accommodate, for example, about 8 to 12 fishing horizontally oriented poles. In some embodiments, adjustable length tubular housings are provided. In other embodiments, a variety of pipe lengths may be mounted to the framework.

The framework components of the inventive caddy include at least two risers, each secured to and rising vertically from a base plate at one end. The base plates are operative to mount the caddy to a gunnel. Together, these components form a framework for the caddy. Each riser may have multiple holes passing through both sides of the riser, evenly spaced along its length, to accommodate securing components for attaching the pipes. Alternatively, the risers may have clamps or hooks molded into the riser to hold or bear the pipes. For example, each riser may have about 4-8 holes, preferably about 6 holes, drilled at about 1" to 3" intervals, such as at about 2¼" intervals. The number of holes may be predetermined to accommodate a predetermined maximum number of pipes. The pipes may be mounted in parallel pairs, arranged with one on each side of the framework. Each riser may, in some embodiments, have an insert in the open end of the riser distal from the base plate. The insert may be, for example, a plastic plug. The plug may serve to keep dirt and animals out of the tubing.

According to some embodiments of the invention, a cross member may be provided between and/or attached to the two risers to provide stability and may also be used as a carrying handle for transport and storage when the caddy is not attached to a boat gunnel.

The storage components include at least two thin-walled pipes, each split along the length of the pipe to form a lengthwise gap in the pipe. The number of pipes may vary according to the number of poles to be housed. Preferably, the caddy is provided with an even number of pipes, positioned on opposite attachment sides of the risers, with two pipes to each hole. The number of pipes is preferably between 4 and 16, more preferably between 8 and 12. The pipes are preferably tubular in shape. The pipes may have a gap along the length of each pipe of ½" to 2", preferably 1" to form semicylindrical trays. Preferably, each end of each pipe is tapered to prevent injury from sharp edges. The pipes may be painted with rubberized coating to secure resting poles and to give the caddy a slip resistant finish. Preferably, the pipes are powder coated. Preferably, both the inside and the outside are coated with rubberized paint.

The securing components or attachment means include mounting hardware to connect the components of the caddy and at least two bungee straps, or other suitable straps or bands, operative to secure fishing poles within the caddy. The mounting hardware may be selected from male coupling members such as bolts, female coupling members such as lock nuts and washers, clamps, hooks, any other suitable hardware to connect the components, and combinations thereof. For example, the tubing may be bolted to the risers. Alternatively, the pipes may be secured to the risers by way of clamps or hooks. In some cases, the pipes may be secured to the risers with a glue, such as a cyanoacrylate adhesive. Preferably, 4 bungee straps are provided (2 on each end of frame) encircling the tubes to secure poles in the caddy. Each bungee strap may be any suitable length, such as about 12" long. At least one connector is generally provided for connecting the components of the caddy and/or for connecting the inventive caddy to the gunnel of the boat.

The components of the caddy may be manufactured from any suitable material. The riser, for example, may be manufactured from thin-wall aluminum or steel tubing with a square cross-section, while the base plate may be a rectangular aluminum or steel plate. The tubular storage components/pipes may be manufactured from a plastic such as polyvinyl chloride (PVC) or any other suitable material. In some embodiments, the pipes may comprise square metallic tubing cut in half lengthwise. The hardware may be manufactured from, for example, aluminum and/or stainless steel. Metallic components of the inventive caddy may also be connected by welding. For example, the risers may be welded to the base plate and the tubing may be welded to the risers.

The caddy may be used by bolting, or otherwise securing, the caddy onto the gunnel of a boat. For example, the base plate may be bolted to the gunnel. Fishing poles may then be put into the caddy pipes, one pole in each pipe, and the poles may be secured with bungee straps.

Figure 4:
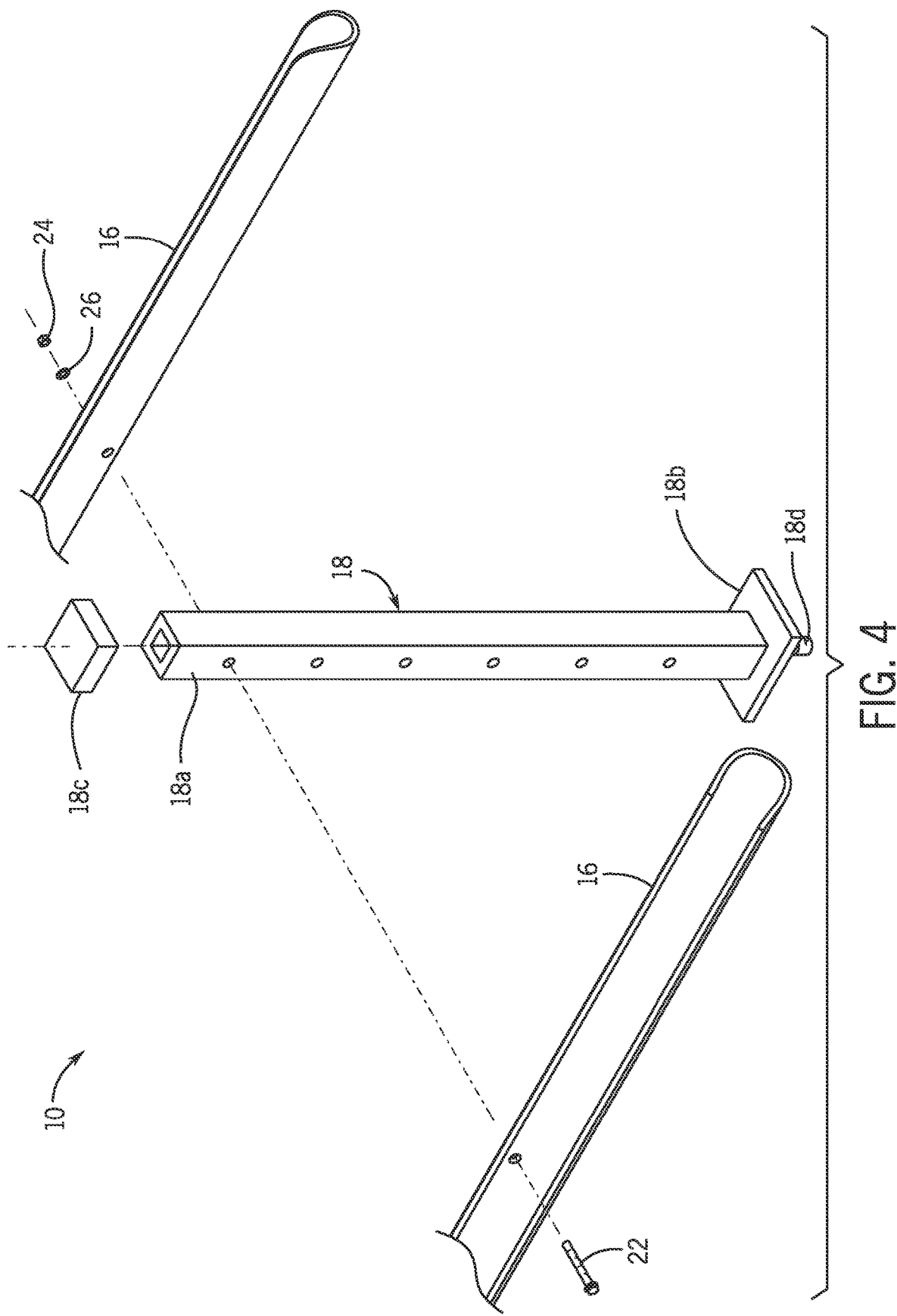
FIG. 4 is an exploded detail perspective view thereof.

Referring to FIGS. 1 to 4, a fishing pole caddy 10 is shown in FIG. 1 with bungees 20 wrapped therearound at two locations, holding fishing rods 14 on a boat 12, which is shown in broken lines for clarity of illustration. FIGS. 1 to 3 illustrate that the caddy 10 generally comprises two riser assemblies 18 to secure the caddy 10 to the gunnel of the boat 12. Each riser assembly may include a vertical tube 18a, shown with a square cross-section in the Figures; a plug 18c inserted at a first end (see FIG. 4); and a base plate 18b formed at a second end, with a threaded stud 18d extending from the base plate 18b. Twelve horizontal pipes or tubes 16 are shown attached with bolts 22, lock nuts 24, and washers 26 perpendicularly to, or transversely to the riser assemblies 18 as shown in FIG. 4, six on each side of the vertical tube 18a. As seen in FIG. 3, the pipes 16 are substantially semicylindrical, i.e., U- or C-shaped in cross-section, providing a longitudinal opening in which to place a fishing rod 14. To use the caddy 10, the threaded studs 18d may be inserted through holes in the boat 12 gunnel and lock washers 18e and nuts 18f may be tightly threaded onto each stud 18d. A fishing rod may then be inserted into each tube 16.

It should be understood, of course, that the foregoing relates to exemplary embodiments of the invention and that modifications may be made without departing from the spirit and scope of the invention as set forth in the following claims.

What is claimed is:

1. A fishing pole caddy for tangle-free storage and transport of fishing poles, comprising:
  a) two or more risers arranged in parallel, each riser having a top end, a bottom end, a first attachment side, a second attachment side opposite to the first attachment side, a base plate at the bottom end, and a male coupling member extending downwardly from the base plate, wherein the two or more risers comprises a first riser and a second riser; wherein the first riser is spaced apart from the second riser a first distance; and
  b) a plurality of substantially semicylindrical trays transversely mounted directly to the first attachment side of each riser and/or the second attachment side of each riser, each substantially semicylindrical tray is perpendicular to and extends between the first and second risers a length that is at least the first distance;
  wherein the male coupling members are operative to vertically attach the risers to a gunnel of a boat such that the substantially semicylindrical trays are each operative to bear a fishing pole therein in a horizontal position.

2. The fishing pole caddy of claim 1, wherein the substantially semicylindrical trays are arranged on the first attachment side of each riser and the second attachment side of each riser in parallel pairs.

3. The fishing pole caddy of claim 1, further comprising a cross member attached to the risers.

4. The fishing pole caddy of claim 1, wherein each of the risers has a plug therein at the top end.

5. The fishing pole caddy of claim 1, further comprising a female coupling member removably attached to each male coupling member.

6. The fishing pole caddy of claim 1, wherein the substantially semicylindrical trays are attached to the risers with an attachment means selected from the group consisting of mounting hardware and adhesive.

7. The fishing pole caddy of claim 1, further comprising a bungee that is operative to encircle the substantially semicylindrical trays, wherein the substantially semicylindrical trays are removably attached to each of the risers.

8. The fishing pole caddy of claim 1, wherein the substantially semicylindrical trays are tapered at each end.

9. The fishing pole caddy of claim 1, wherein the substantially semicylindrical trays further comprise a rubberized coating.

* * * * *